US011262006B2

(12) United States Patent
Oba et al.

(10) Patent No.: US 11,262,006 B2
(45) Date of Patent: Mar. 1, 2022

(54) PIPING JOINT AND RESIN TUBE ASSEMBLY

(71) Applicant: SANOH INDUSTRIAL CO., LTD., Tokyo (JP)

(72) Inventors: Fuminori Oba, Koga (JP); Ukyo Kamazuka, Koga (JP); Junjie Shen, Koga (JP); Masashi Yamaguchi, Koga (JP)

(73) Assignee: SANOH INDUSTRIAL CO., LTD.

( * ) Notice: Subject to any disclaimer, the term of this patent is extended or adjusted under 35 U.S.C. 154(b) by 233 days.

(21) Appl. No.: 16/487,805

(22) PCT Filed: Feb. 7, 2018

(86) PCT No.: PCT/JP2018/004235
§ 371 (c)(1),
(2) Date: Aug. 21, 2019

(87) PCT Pub. No.: WO2018/155187
PCT Pub. Date: Aug. 30, 2018

(65) Prior Publication Data
US 2020/0248846 A1    Aug. 6, 2020

(30) Foreign Application Priority Data

Feb. 23, 2017   (JP) .............................. JP2017-032423

(51) Int. Cl.
*F16L 33/10*   (2006.01)
*F16L 21/02*   (2006.01)
(Continued)

(52) U.S. Cl.
CPC ............. *F16L 21/02* (2013.01); *F16L 37/084* (2013.01); *F16L 17/02* (2013.01); *F16L 21/08* (2013.01); *F16L 37/05* (2013.01); *F16L 2201/10* (2013.01)

(58) Field of Classification Search
CPC . F16L 21/02; F16L 33/02; F16L 33/03; F16L 33/023; F16L 33/10; F16L 47/08; F16L 47/12; F16L 37/05
(Continued)

(56) References Cited

U.S. PATENT DOCUMENTS

| 2,544,764 A | 3/1951 | Parkes |
| 4,345,783 A | 8/1982 | Bergstrand |
| 2005/0040649 A1* | 2/2005 | Katayama ............... F16L 47/22 285/319 |

FOREIGN PATENT DOCUMENTS

| CN | 1093453 A | 10/1994 |
| CN | 202165732 U | 3/2012 |

(Continued)

OTHER PUBLICATIONS

International Search Report for related PCT App No. PCT/JP2018/004235 dated May 1, 2018, 1 pgs.
(Continued)

*Primary Examiner* — Aaron M Dunwoody
(74) *Attorney, Agent, or Firm* — Procopio, Cory, Hargreaves & Savitch LLP

(57) ABSTRACT

A piping joint connects a resin tube to a connection pipe having a protrusion formed on an outer peripheral surface of a distal end portion of the connection pipe. The piping joint includes a housing press-fitted into the resin tube and an elastically extendable and contractible seal member into which the connection pipe is inserted such that sealing is performed between the connection pipe and the seal member. The housing has a first housing portion positioned in one end portion and having an outer peripheral surface side press-fitted into the resin tube and a second housing portion positioned in the other end portion. The seal member has a first seal portion inserted on an inner peripheral surface side of the second housing portion.

5 Claims, 9 Drawing Sheets

(51) Int. Cl.
*F16L 37/084* (2006.01)
*F16L 17/02* (2006.01)
*F16L 21/08* (2006.01)
*F16L 37/05* (2006.01)

(58) Field of Classification Search
USPC .................. 285/252, 254, 374, 345, 319
See application file for complete search history.

(56) References Cited

FOREIGN PATENT DOCUMENTS

| | | |
|---|---|---|
| DE | 4308367 A1 | 9/1994 |
| DE | 69312040 T2 | 1/1998 |
| FR | 508967 A | 10/1920 |
| JP | H07198072 A | 8/1995 |
| JP | H09-329284 A | 12/1997 |
| JP | H11-164506 A | 6/1999 |
| JP | 2000-352492 A | 12/2000 |
| JP | 2007051678 A | 3/2007 |
| JP | 2007127265 A | 5/2007 |

OTHER PUBLICATIONS

International Preliminary Reporting on Patentability for related PCT App No. PCT/JP2018/004235, dated Sep. 6, 2019, 8 pgs.

\* cited by examiner

PIPING JOINT AND RESIN TUBE ASSEMBLY

CROSS-REFERENCE TO RELATED APPLICATIONS

This application is a U.S. National Stage entry of PCT Application No: PCT/JP2018/004235 filed Feb. 7, 2018, which claims priority to Japanese Patent Application No. 2017-032423, filed Feb. 23, 2017, the contents of which are incorporated herein by reference.

TECHNICAL FIELD

An aspect of the present invention relates to a piping joint connecting a resin tube to a connection pipe having a protrusion formed on an outer peripheral surface of a distal end portion of the connection pipe and a resin tube assembly provided with the piping joint.

BACKGROUND ART

In an automotive cooling circuit of the related art or the like, a flexible hose having flexibility, such as a rubber hose, is connected to a connection pipe having a protrusion formed on an outer peripheral surface of a distal end portion of the connection pipe (see, for example, Patent Literature 1). The protrusion is also called a bulge shape, a curl shape, and so on and has a function to retain the flexible hose with respect to the connection pipe and ensure sealability between the flexible hose and the protrusion.

At present, it is conceivable to use a lighter resin tube instead of the flexible hose regarding requests for weight reduction of an automobile and the like. However, the resin tube allowing the weight reduction has no flexibility whereas the rubber hose is flexible, and thus the resin tube cannot be fitted into the connection pipe as it is.

In this regard, Patent Literature 2 proposes a piping joint using a retainer. In the piping joint, an engagement projection is formed on an outer peripheral surface of a middle portion of a connection pipe and the retainer of the piping joint to which a resin tube is connected is engaged with the engagement projection. The resin tube is connected to the connection pipe as a result.

CITATION LIST

Patent Literature

Patent Literature 1: Japanese Unexamined Patent Publication No. 2000-352492
Patent Literature 2: Japanese Unexamined Patent Publication No. H09-329284

SUMMARY OF INVENTION

Technical Problem

In the piping joint described in Patent Literature 2, the shape of the connection pipe is different from the shape of a connection pipe for flexible hose connection. Accordingly, the specifications of the connection pipe as well as piping need to be changed during piping replacement of a flexible hose with a resin tube.

An object of an aspect of the present invention is to provide a piping joint and a resin tube assembly allowing a resin tube to be connected to a connection pipe for flexible hose connection as well.

Solution to Problem

A piping joint according to an aspect of the present invention connects a resin tube to a connection pipe having a protrusion formed on an outer peripheral surface of a distal end portion of the connection pipe. The piping joint includes a housing press-fitted into the resin tube and an elastically extendable and contractible seal member into which the connection pipe is inserted such that sealing is performed between the connection pipe and the seal member. The housing has a first housing portion positioned in one end portion and having an outer peripheral surface side press-fitted into the resin tube and a second housing portion positioned in the other end portion. The seal member has a first seal portion inserted on an inner peripheral surface side of the second housing portion.

The elastically extendable and contractible seal member is provided in the piping joint, and thus the connection pipe for flexible hose connection can be inserted into the seal member. The connection pipe and the resin tube can be connected by the piping joint by the first housing portion of the housing being press-fitted into the resin tube and the connection pipe being inserted into the seal member. Since the first seal portion is inserted on the inner peripheral surface side of the second housing portion, the first seal portion is sandwiched and pressed by the second housing portion and the protrusion of the connection pipe once the connection pipe is inserted on the inner peripheral surface side of the first seal portion. As a result, sealability can be enhanced between the first seal portion and the second housing and the connection pipe.

The piping joint may further include a seal band tightening the seal member and the seal member may have a second seal portion protruding from the housing and tightened to the seal band. In the piping joint, the second seal portion protruding from the housing is tightened by the seal band, and thus the seal member can be pressed against the connection pipe. As a result, connection strength can be improved between the seal member and the connection pipe and sealability can be improved between the seal member and the connection pipe. Accordingly, an aspect of the present invention is especially effective in a case where, for example, the pressure of the fluid that flows in piping is high and the sealability between the connection pipe and the first seal portion is insufficient with the force of sandwiching of the first seal portion by means of the first housing portion and the protrusion of the connection pipe.

A recess may be formed in either an inner peripheral surface of the second housing portion or an outer peripheral surface of the first seal portion and a protrusion fitted into the recess may be formed on the other of the inner peripheral surface of the second housing portion and the outer peripheral surface of the first seal portion. In the piping joint, the protrusion formed on the other of the inner peripheral surface of the second housing portion and the outer peripheral surface of the first seal portion is fitted into the recess formed in either the inner peripheral surface of the second housing portion or the outer peripheral surface of the first seal portion, and thus falling of the seal member can be suppressed with respect to the housing.

The housing and the seal member may be integrally molded. In the piping joint, the housing and the seal member are integrally formed, and thus falling of the seal member from the housing can be suppressed and sealability can be improved between the second housing portion of the housing and the first seal portion of the seal member.

The housing and the seal member may be separate members. In the piping joint, the housing and the seal member are separate members, and thus manufacturing can be facilitated. In this case, falling of the seal member can be suppressed with respect to the housing by, for example, the inner peripheral surface of the second housing portion and the outer peripheral surface of the first seal portion being provided with irregularities fitted into each other or the first seal portion 51 being press-fitted into the second housing portion 42.

A resin tube assembly according to an aspect of the present invention includes a resin tube and the piping joint. The first housing portion is press-fitted in the resin tube. In the resin tube assembly, the resin tube is press-fitted in the first housing portion of the piping joint, and thus the resin tube can be connected to a connection pipe for flexible hose connection as well by insertion of the connection pipe into a seal member.

Advantageous Effects of Invention

According to an aspect of the present invention, a resin tube can be connected to a connection pipe for flexible hose connection as well.

DESCRIPTION OF EMBODIMENTS

Figure 1:
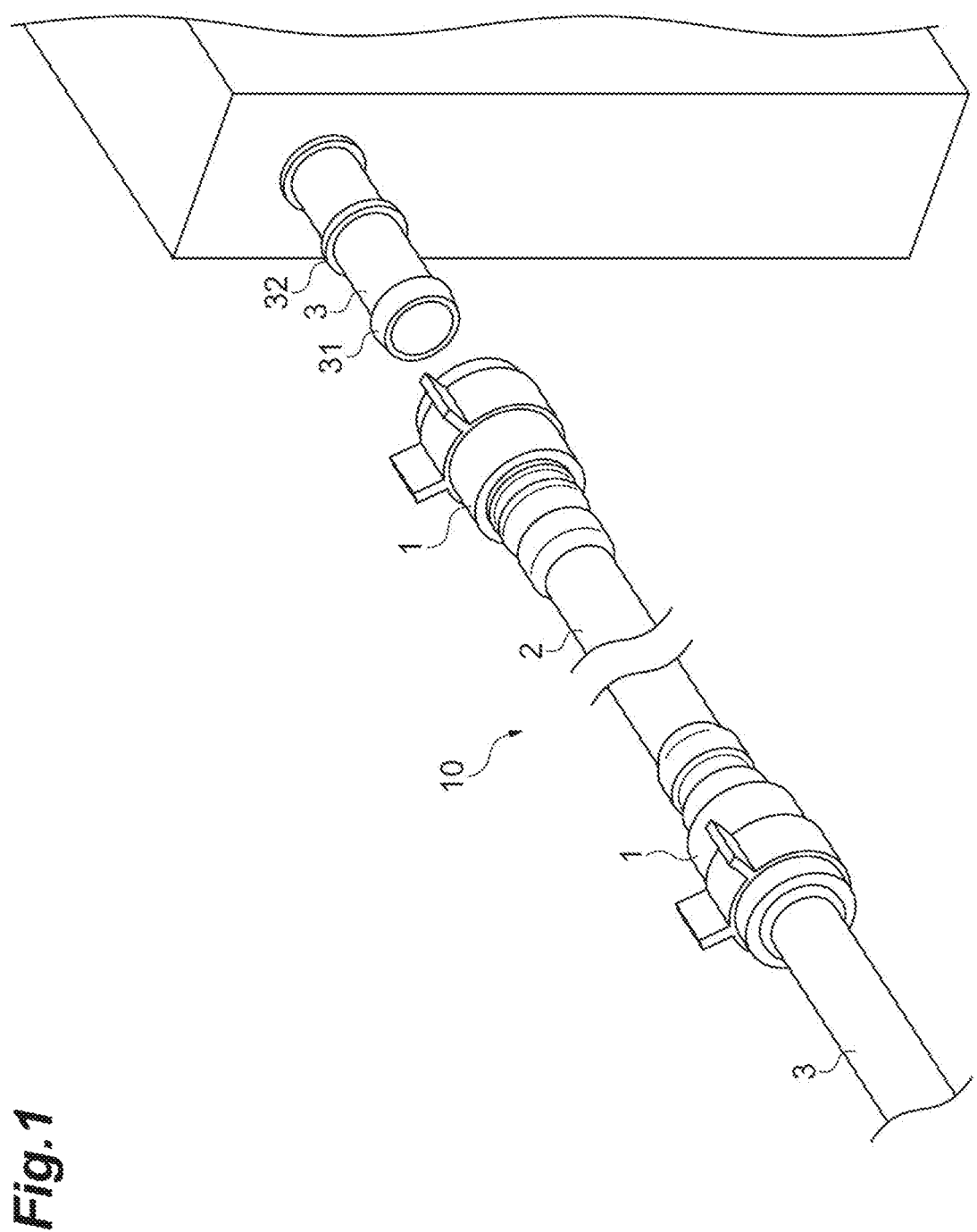
FIG. 1 is a perspective view illustrating a state where a resin tube assembly of the present embodiment is connected to a connection pipe.

Hereinafter, a piping joint and a resin tube assembly according to an embodiment will be described with reference to accompanying drawings. In the present embodiment, the same or corresponding elements in the drawings are denoted by the same reference numerals with redundant description omitted.

Figure 2:
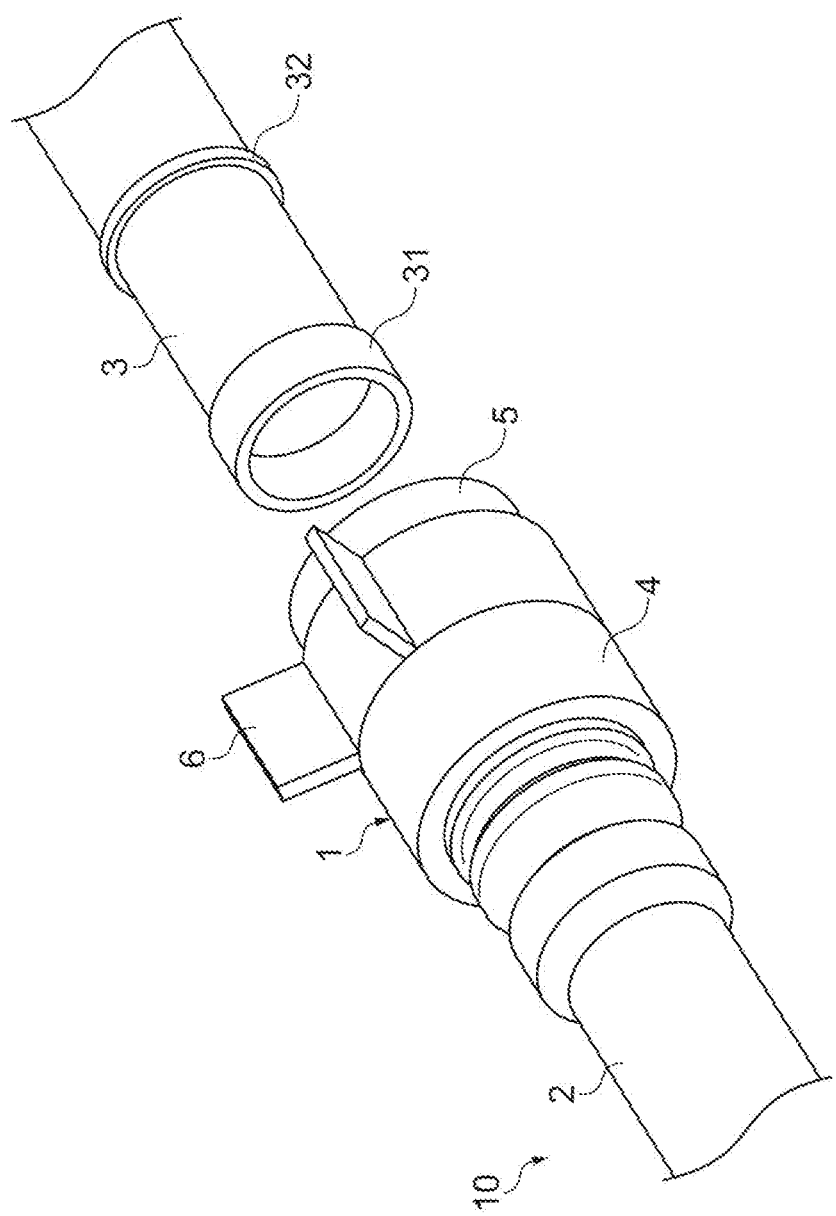
FIG. 2 is a perspective view illustrating a part where the resin tube assembly and the connection pipe are connected to each other.
Figure 3:
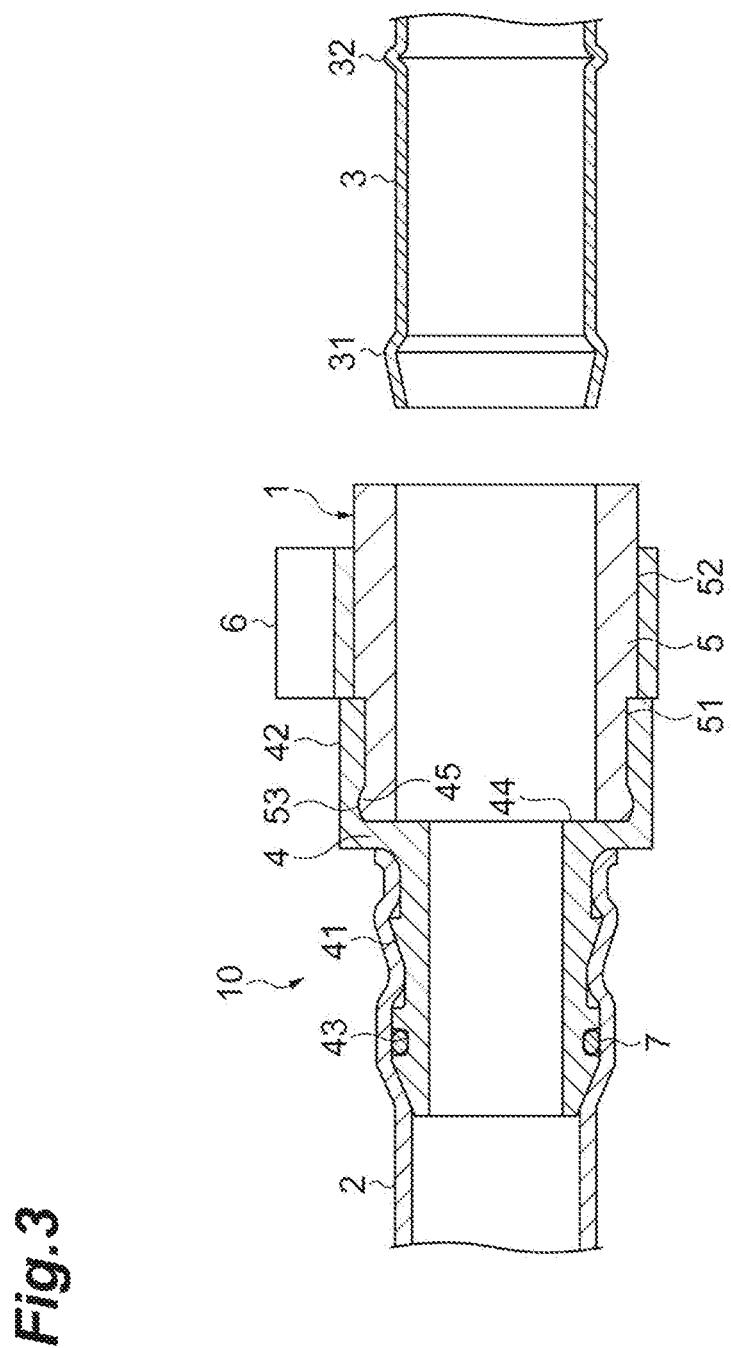
FIG. 3 is a cross-sectional view illustrating the part where the resin tube assembly and the connection pipe are connected to each other.
Figure 4:
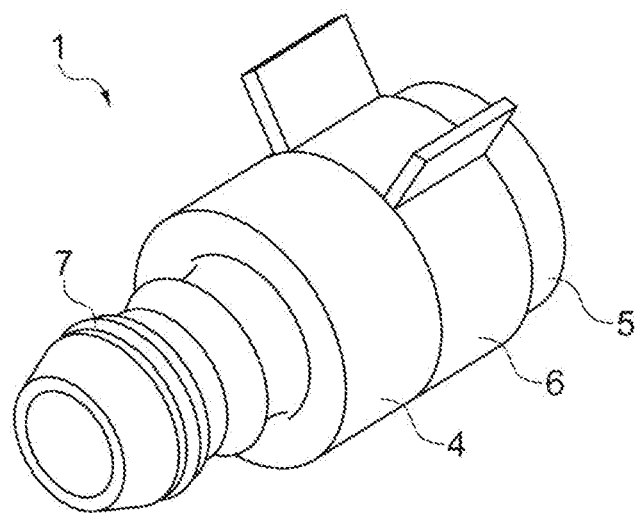
FIG. 4 is a perspective view illustrating a piping joint of the present embodiment.
Figure 5:
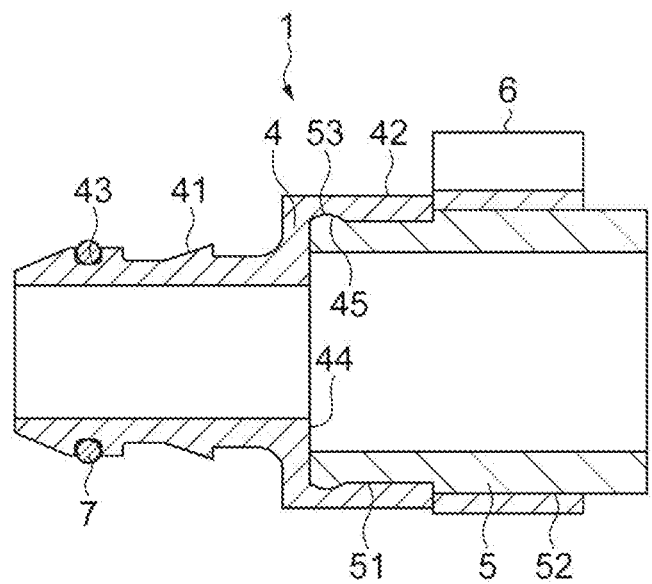
FIG. 5 is a cross-sectional view illustrating the piping joint of the present embodiment.
Figure 6:
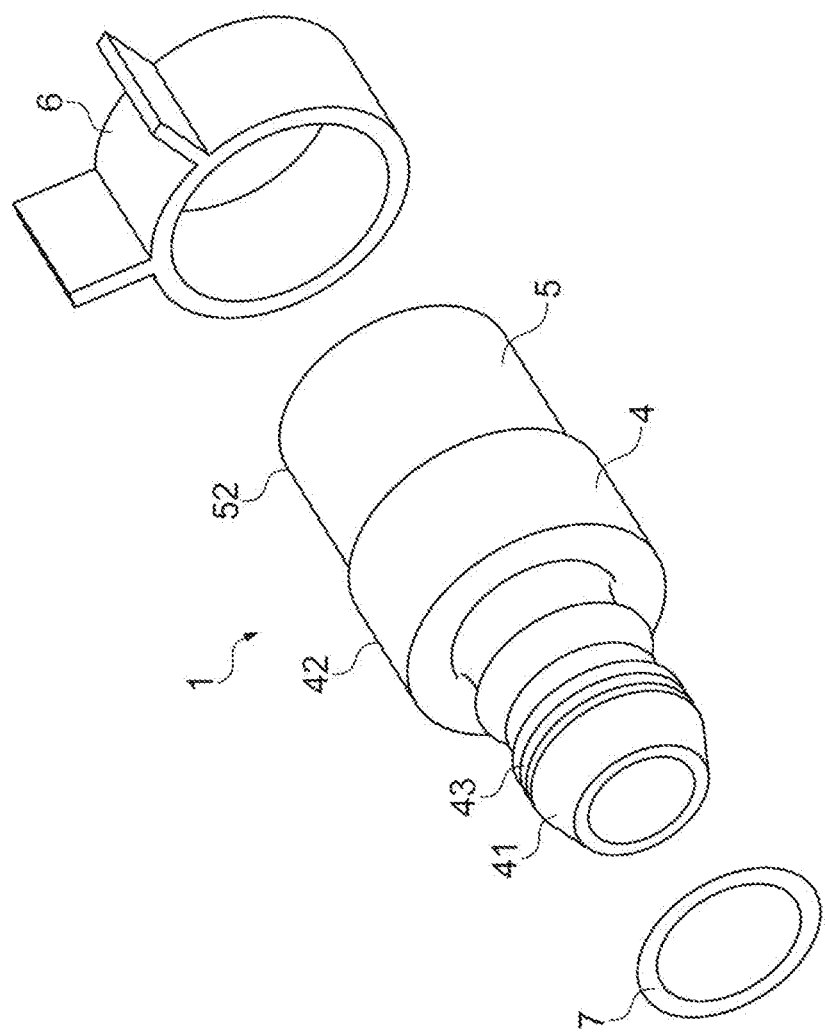
FIG. 6 is an exploded perspective view illustrating the piping joint of the present embodiment.

As illustrated in FIGS. 1 to 3, a piping joint 1 according to the present embodiment is a joint for connecting a resin tube 2 to a connection pipe 3. The piping joint 1 and the resin tube 2 constitute a resin tube assembly 10.

The resin tube 2 is used for weight reduction and as a substitute for a flexible hose having flexibility such as a rubber hose. The resin tube 2 is formed of a resin lighter than the flexible hose. Although the resin that forms the resin tube 2 is not particularly limited, a polyamide-based resin, a polyphenylene sulfide resin, and the like can be used from the viewpoint of weight reduction.

The connection pipe 3 is a pipe used for flexible hose connection. Although the connection pipe 3 is usually made of metal, the connection pipe 3 may be made of a non-metal material such as a resin as well. The connection pipe 3 extends in a cylindrical shape. The connection pipe 3 is provided with a protrusion 31, which is formed on the outer peripheral surface of the distal end portion of the connection pipe 3. The protrusion 31 is formed in a ring shape over the entire circumference of the connection pipe 3. Although the cross-sectional shape of the protrusion 31 is not particularly limited, the shape can be, for example, a circular shape (curl shape) or a tapered shape (bulge shape) decreasing in thickness toward the distal end. If necessary, a protrusion 32 (spool) may be provided on the outer peripheral surface of the connection pipe 3 that is closer to the proximal end side than the protrusion 31. The distal end portion of the connection pipe 3 means not only the distal end of the connection pipe 3 but also the vicinity of the distal end. Accordingly, the protrusion 31 may be formed at a position that is slightly proximal from the distal end of the connection pipe 3 insofar as the protrusion 31 is in the vicinity of the distal end of the connection pipe 3. The proximal end side of the connection pipe 3 refers to the side of the connection pipe 3 that is opposite to the distal end.

As illustrated in FIGS. 1 to 6, the piping joint 1 is provided with a housing 4, a seal member 5, and a seal band 6.

The housing 4 is press-fitted into the resin tube. The housing 4 is formed of a material that has no flexibility at room temperature. Although the material of the housing 4 is not particularly limited, a reinforced resin in which a glass fiber is blended with a polyamide-based resin or a polyphenylene sulfide resin can be used as an example from the viewpoint of strength. The housing 4 is formed in a substantially cylindrical shape. The housing 4 is provided with a first housing portion 41 and a second housing portion 42.

The first housing portion 41 is a part positioned in one end portion of the housing 4 and the outer peripheral surface side of the first housing portion 41 is press-fitted into the resin tube 2. The outer peripheral surface of the first housing portion 41 is formed in an uneven shape so that the resin tube 2 is retained and sealability is ensured between the resin tube 2 and the outer peripheral surface. The maximum diameter of the outer peripheral surface of the first housing portion 41 is larger than the inner diameter of the resin tube 2. If necessary, a circumferential groove 43 may be formed in the outer peripheral surface of the first housing portion 41 and an O-ring 7 for improving the sealability between the resin tube 2 and the outer peripheral surface may be fitted into the groove 43. In this case, an O-ring made of an elastically extending and contracting elastic member such as rubber is used as the O-ring 7.

The second housing portion 42 is a part positioned in the other end portion of the housing 4. The seal member 5 is inserted into the second housing portion 42. The other end portion of the housing 4 is on the side that is opposite to the end portion of the housing 4 where the first housing portion 41 is formed.

The inner diameters of the second housing portion 42 and the first housing portion 41 may or may not be equal to each other. In a case where the inner diameter of the second housing portion 42 is larger than the inner diameter of the first housing portion 41, a step surface 44 is formed between the inner peripheral surface of the first housing portion 41 and the inner peripheral surface of the second housing portion 42. The distal end portion of the connection pipe 3 inserted in the seal member 5 abuts against the step surface 44. The step surface 44 extends in a direction orthogonal to the axial direction of the housing 4 and is directed toward the axial direction of the housing 4. In a case where the inner diameter of the second housing portion 42 is smaller than the inner diameter of the first housing portion 41 or in a case where the inner diameter of the second housing portion 42 and the inner diameter of the first housing portion 41 are equal to each other, a rib (not illustrated) against which the distal end portion of the connection pipe 3 abuts may be formed on the inner peripheral surface of the housing 4.

A recess 45 is formed in the inner peripheral surface of the second housing portion 42. The recess 45 is a part into which a protrusion 53 of the seal member 5 (described later) is fitted. The recess 45 is formed in a ring shape over the entire circumference of the inner peripheral surface of the second housing portion 42. Although the concave shape of the recess 45 is not particularly limited, the shape can be circular, elliptical, triangular, quadrangular, and so on. Although the position of formation of the recess 45 in the axial direction of the housing 4 is not particularly limited, the position can be a position adjacent to the step surface 44, the vicinity of the step surface 44, or the like.

The connection pipe 3 is inserted into the seal member 5 and the space between the inserted connection pipe 3 and the seal member 5 is sealed. The seal member 5 is formed of an elastically extendable and contractible material. Although the material that forms the seal member 5 is not particularly limited, ethylene propylene rubber, fluororubber, fluorosilicone rubber, hydrogenated nitrile rubber, and the like can be used from the viewpoint of elastic extension and contraction and sealability. The seal member 5 is formed in a substantially cylindrical shape. The seal member 5 is provided with a first seal portion 51 and a second seal portion 52.

The first seal portion 51 is a part inserted on the inner peripheral surface side of the second housing portion 42. In a case where the inner diameter of the second housing portion 42 is larger than the inner diameter of the first housing portion 41, the distal end of the first seal portion 51 abuts against the step surface 44 against which the distal end portion of the connection pipe 3 abuts. Then, the step surface 44 extends to the inner side beyond the first seal portion 51 such that the distal end portion of the connection pipe 3 abuts against the step surface 44. In a case where the inner diameter of the first seal portion 51 is smaller than the inner diameter of the first housing portion 41, the distal end of the first seal portion 51 abuts against the rib (not illustrated) against which the distal end portion of the connection pipe 3 abuts. Then, the rib extends to the inner side beyond the first seal portion 51 such that the distal end portion of the connection pipe 3 abuts against the rib.

The protrusion 53 fitted into the recess 45 is formed on the outer peripheral surface of the first seal portion 51. The protrusion 53 is formed at a position and in a shape corresponding to the recess 45. The protrusion 53 locks the seal member 5 with respect to the housing 4 in the axial direction of the housing 4 by being fitted into the recess 45. Accordingly, the protrusion 53 has a function to suppress the escape of the seal member 5 from the housing 4.

The second seal portion 52 is a part protruding from the housing 4 and tightened to the seal band 6. The inner diameter of the second seal portion 52 is equal to the inner diameter of the first seal portion 51. Accordingly, the connection pipe 3 can be easily inserted into the seal member 5 and the entire connection pipe 3 inserted in the seal member 5 can be in close contact with the seal member 5. The outer diameter of the second seal portion 52 is larger than the outer diameter of the first seal portion 51. Accordingly, a stable tightening force can be obtained by the outer shape of the second seal portion 52 being set for an appropriate interference with respect to the inner diameter of the seal band 6 narrowed by an interference.

The housing 4 and the seal member 5 are integrally formed. In other words, the housing 4 and the seal member 5 are configured as one unit in which the inner peripheral surface of the second housing portion 42 and the outer peripheral surface of the first seal portion 51 are in close contact with and inseparable from each other. Accordingly, the space between the housing 4 and the seal member 5 remains sealed. The housing 4 and the seal member 5 can be integrally formed by, for example, two-color molding. Alternatively, the housing 4 and the seal member 5 may be integrally formed by a manufacturing method other than two-color molding.

The seal band 6 tightens the second seal portion 52 of the seal member 5. The seal band 6 presses the second seal portion 52 against the connection pipe 3 inserted in the seal member 5 by tightening the second seal portion 52. Various known seal bands can be used as the seal band 6. For example, a seal band tightening a rubber hose to the connection pipe 3 can be used. In this case, the seal band 6 is preferably a metallic fastening band from the viewpoint of an increase in tightening force. The metallic fastening band is, for example, a circular elastic spring having knobs attached at both ends. The tightening force decreases when the knobs are pinched and the tightening force increases when the knobs are released.

The piping joint 1 is configured as the resin tube assembly 10 in which the first housing portion 41 is press-fitted in the resin tube 2. As for the resin tube assembly 10, the piping joint 1 may be press-fitted in only one end portion of the resin tube 2 or the piping joint 1 may be press-fitted in both end portions of the resin tube 2.

Figure 7:
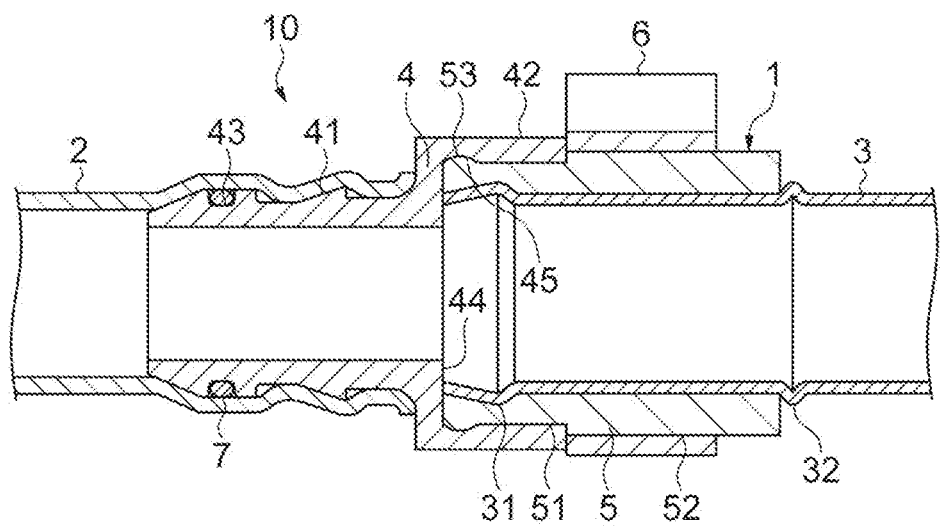
FIG. 7 is a cross-sectional view illustrating a state where the resin tube assembly is already connected to the connection pipe.

The elastically extendable and contractible seal member 5 is provided in the piping joint 1 and the resin tube assembly 10 configured as described above, and thus the connection pipe 3 for flexible hose connection can be inserted into the seal member 5 as illustrated in FIG. 7. The first housing portion 41 of the housing 4 is press-fitted in the resin tube 2, and thus the connection pipe 3 and the resin tube 2 can be connected by the piping joint 1 by the connection pipe 3 being inserted into the seal member 5.

The first seal portion 51 is inserted on the inner peripheral surface side of the second housing portion 42. Accordingly, once the connection pipe 3 is inserted on the inner peripheral surface side of the first seal portion 51, the first seal portion 51 is sandwiched and pressed by the second housing portion 42 and the protrusion 31 of the connection pipe 3. As a result, sealability can be enhanced between the connection pipe 3 and the first seal and second housing portions 51 and 42.

Since the second seal portion 52 protruding from the housing 4 is tightened by the seal band 6, the seal member 5 can be pressed against the connection pipe 3. As a result, connection strength can be improved between the seal member 5 and the connection pipe 3 and sealability can be improved between the seal member 5 and the connection pipe 3. Accordingly, the present embodiment is especially effective in a case where, for example, the pressure of the fluid that flows in piping is high and the sealability between the connection pipe 3 and the first seal portion 51 is insufficient with the force of sandwiching of the first seal portion 51 by means of the second housing portion 42 and the protrusion 31 of the connection pipe 3.

The protrusion 53 formed on the outer peripheral surface of the first seal portion 51 is fitted into the recess 45 formed in the inner peripheral surface of the second housing portion 42, and thus falling of the seal member 5 can be suppressed with respect to the housing 4.

The housing 4 and the seal member 5 are integrally formed, and thus falling of the seal member 5 from the housing 4 can be suppressed and sealability can be improved between the second housing portion 42 of the housing 4 and the first seal portion 51 of the seal member 5.

Although a preferred embodiment of the present invention has been described above, the present invention is not limited to the embodiment described above.

Figure 8:
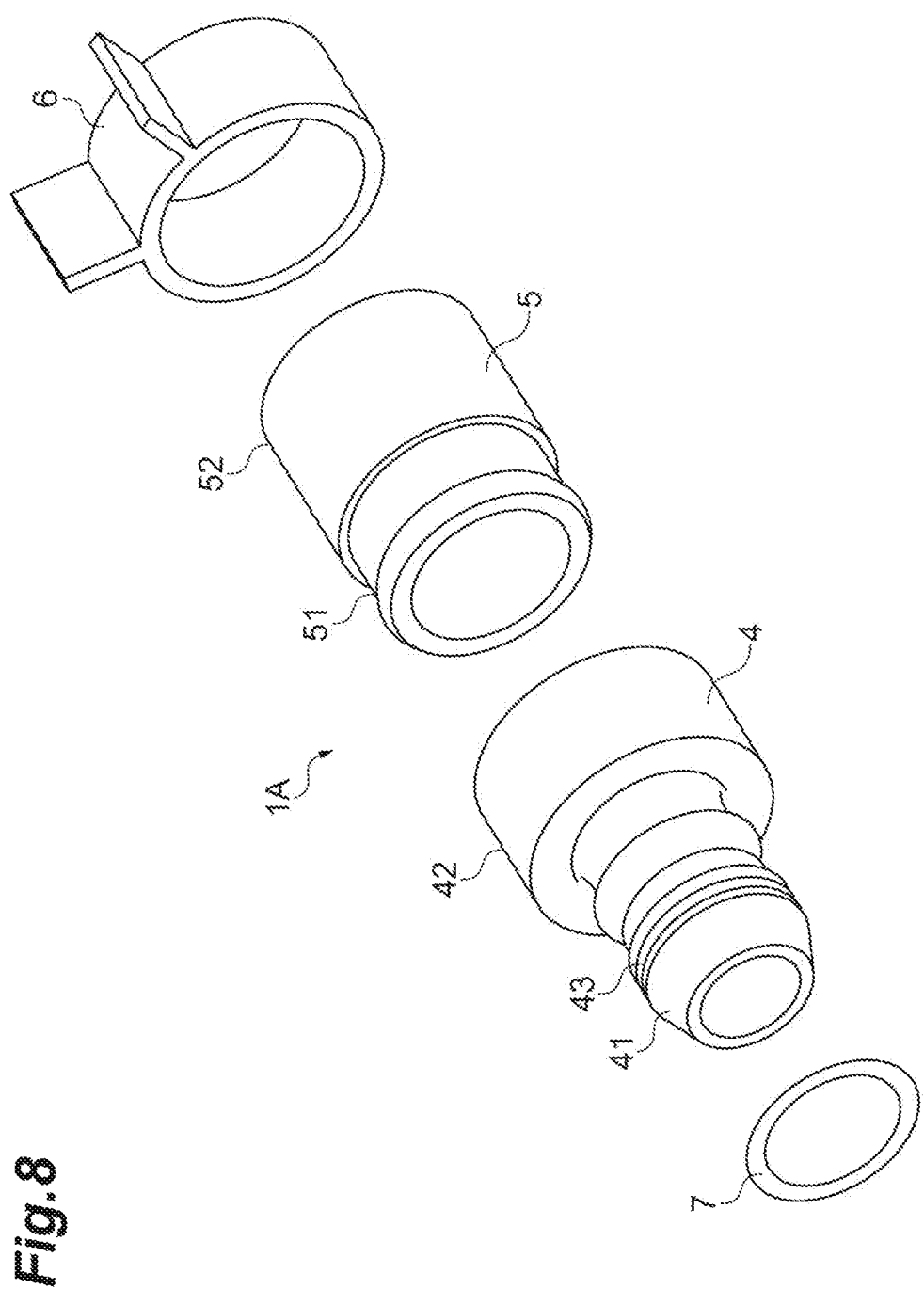
FIG. 8 is an exploded perspective view illustrating a piping joint of a modification example.

For example, the housing 4 and the seal member 5 are integrally formed according to the description of the embodiment. Alternatively, the housing 4 and the seal member 5 may be separate members as in a piping joint 1A illustrated in FIG. 8. In the piping joint 1A, the housing 4 and the seal member 5 are separate members, and thus manufacturing can be facilitated. In this case, falling of the seal member 5 can be suppressed with respect to the housing 4 by the protrusion 53 formed on the outer peripheral surface of the first seal portion 51 being fitted into the recess 45 formed in the inner peripheral surface of the second housing portion 42 (see FIG. 7). Even in a case where the recess 45 and the protrusion 53 are not provided, falling of the seal member 5 can be suppressed with respect to the housing 4 by, for example, the first seal portion 51 being press-fitted into the second housing portion 42. The effect is further improved by adhesive-based fixing of the seal member 5 and the inner surface of the second housing portion 42 if necessary.

Figure 9:
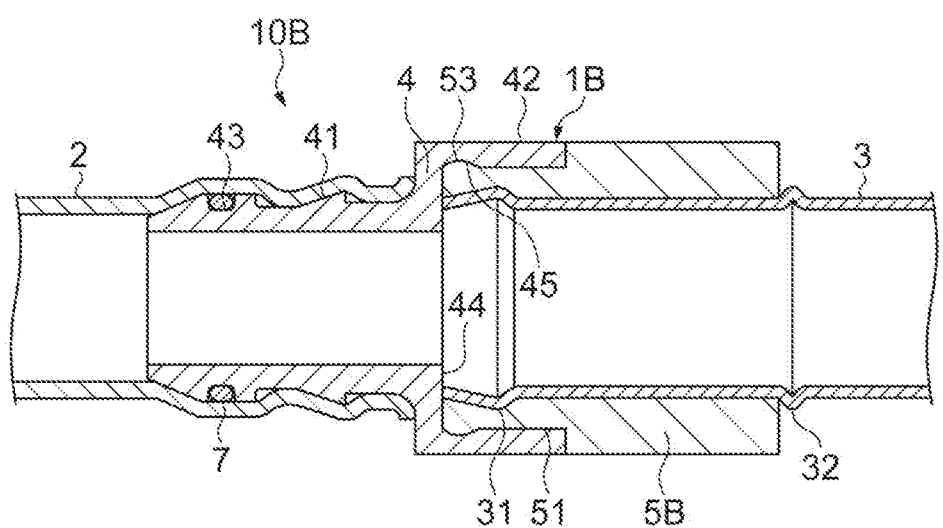
FIG. 9 is a cross-sectional view illustrating a state where a resin tube assembly of a modification example is already connected to the connection pipe.

The seal member 5 is provided with the first seal portion 51 and the second seal portion 52 according to the description of the embodiment. Alternatively, a seal member 5B may be provided with only the first seal portion 51, as in a piping joint 1B of a resin tube assembly 10B illustrated in FIG. 9, in the case of using under an environment of low intra-piping internal pressure difference or a negative pressure environment. In this case, the seal band is unnecessary. Even in this case, sealability can be ensured between the connection pipe 3 and the first seal and second housing portions 51 and 42 by means of, for example, the force of elastic extension and contraction of the seal member 5B and the force of sandwiching of the first seal portion 51 by means of the second housing portion 42 and the protrusion 31 of the connection pipe 3.

The recess 45 is formed in the inner peripheral surface of the second housing portion 42 and the protrusion 53 fitted into the recess 45 is formed on the outer peripheral surface of the first seal portion 51 according to the description of the embodiment. Alternatively, a recess may be formed in either the inner peripheral surface of the second housing portion 42 or the outer peripheral surface of the first seal portion 51 and a protrusion fitted into the recess may be formed on the other of the inner peripheral surface of the second housing portion 42 and the outer peripheral surface of the first seal portion 51. For example, the recess may be formed in the outer peripheral surface of the first seal portion 51 and the protrusion fitted into the recess may be formed on the inner peripheral surface of the second housing portion 42.

The piping joint 1 is configured as the resin tube assembly 10 in which the first housing portion 41 is press-fitted in the resin tube 2 according to the description of the embodiment. Alternatively, the piping joint 1 may be configured simply as the piping joint 1 that is yet to be assembled as the resin tube assembly 10. Even in this case, the connection pipe 3 and the resin tube 2 can be connected by the piping joint 1 by the first housing portion 41 of the housing 4 being press-fitted into the resin tube 2 and the connection pipe 3 being inserted into the seal member 5.

REFERENCE SIGNS LIST

1, 1A, 1B: piping joint, 2: resin tube, 3: connection pipe, 31: protrusion, 32: protrusion, 4: housing, 41: first housing portion, 42: second housing portion, 43: groove, 44: step surface, 45: recess, 5, 5B: seal member, 51: first seal portion, 52: second seal portion, 53: protrusion, 6: seal band, 7: O-ring, 10, 10B: resin tube assembly.

The invention claimed is:

1. A piping joint connecting a resin tube to a connection pipe having a protrusion formed on an outer peripheral surface of a distal end portion of the connection pipe, the piping joint comprising:
   a housing press-fitted into the resin tube;
   an elastically extendible and contractible seal member into which the connection pipe is inserted such that sealing is performed between the connection pipe and the seal member; and
   a seal band tightening the seal member, wherein
   the housing has a first housing portion positioned in one end portion and having an outer peripheral surface side press-fitted into the resin tube and a second housing portion positioned in the other end portion, and
   the seal member has a first seal portion inserted on an inner peripheral surface side of the second housing portion and a second seal portion protruding from the housing and tightened to the seal band.

2. The piping joint according to claim 1, wherein
   a recess is formed in either an inner peripheral surface of the second housing portion or an outer peripheral surface of the first seal portion, and
   a protrusion fitted into the recess is formed on the other of the inner peripheral surface of the second housing portion and the outer peripheral surface of the first seal portion.

3. The piping joint according to claim 1, wherein the housing and the seal member are integrally molded.

4. The piping joint according to claim 1, wherein the housing and the seal member are separate members.

5. A resin tube assembly comprising:
   a resin tube,
   a connection pipe having a protrusion formed on an outer peripheral surface of a distal end portion of the connection pipe; and
   a piping joint connecting the resin tube to the connection pipe, the piping joint comprising:
      a housing press-fitted into the resin tube;
      an elastically extendible and contractable seal member into which the connection pipe is inserted such that sealing is performed between the connection pipe and the seal member; and
      a seal band tightening the seal member; wherein
      the housing has a first housing portion positioned in one end portion and having an outer peripheral surface side press-fitted into the resin tube and a second housing portion positioned in the other end portion, and the seal member has a first seal portion inserted on an inner peripheral surface side of the second housing portion and a second seal portion protruding from the housing and tightened to the seal band.

\* \* \* \* \*